(12) United States Patent
Washington et al.

(10) Patent No.: US 7,979,692 B1
(45) Date of Patent: Jul. 12, 2011

(54) DEVICE-TO-DEVICE AND CLIENT SERVER BASED VIDEO MONITORING AND VIDEO TELECONFERENCING/SERVER NETWORKING TECHNOLOGY FOR REMOTE MONITORING

(75) Inventors: Darnell Washington, Altanta, GA (US); Phillip A. Cummings, Baltimore, MD (US)

(73) Assignee: Teleport Systems, Inc., Baltimore, MD (US)

( * ) Notice: Subject to any disclaimer, the term of this patent is extended or adjusted under 35 U.S.C. 154(b) by 1135 days.

(21) Appl. No.: 11/421,737

(22) Filed: Jun. 1, 2006

Related U.S. Application Data

(60) Provisional application No. 60/685,874, filed on Jun. 1, 2005.

(51) Int. Cl.
*H04L 29/06* (2006.01)
(52) U.S. Cl. .......................... 713/153; 713/150
(58) Field of Classification Search .......... 713/150–154, 713/160–162; 726/2, 3, 1, 26–30, 22–25, 726/12; 709/220, 223, 224, 238, 249; 370/259–262; 380/200–202; 348/14.01, 14.02, 14.08, 14.09, 348/14.1, 14.11, 211.1, 211.2, 211.3, 211.4, 348/211.8, 211.11, 211.12, 211.13
See application file for complete search history.

(56) References Cited

U.S. PATENT DOCUMENTS

| | | | | |
|---|---|---|---|---|
| 6,133,941 A * | 10/2000 | Ono | .......................... | 348/14.05 |
| 6,414,998 B1 * | 7/2002 | Yoshinari et al. | ........ | 375/240.25 |
| 6,556,241 B1 * | 4/2003 | Yoshimura et al. | ...... | 348/211.99 |
| 6,670,984 B1 * | 12/2003 | Tanaka et al. | .................. | 348/159 |
| 6,826,684 B1 * | 11/2004 | Fink et al. | ...................... | 713/160 |
| 6,831,899 B1 * | 12/2004 | Roy | .............................. | 370/260 |
| 6,965,398 B2 * | 11/2005 | Arakt | .......................... | 348/211.3 |
| 6,989,856 B2 * | 1/2006 | Firestone et al. | .......... | 348/14.09 |
| 7,154,538 B1 * | 12/2006 | Fukasawa et al. | ......... | 348/211.3 |
| 7,443,983 B2 * | 10/2008 | Tanizawa et al. | ............. | 380/270 |
| 7,495,687 B2 * | 2/2009 | DuMas et al. | ................ | 348/143 |
| 7,519,986 B2 * | 4/2009 | Singhal | ............................ | 726/2 |
| 7,643,513 B2 * | 1/2010 | Yang et al. | ..................... | 370/503 |
| 2002/0097701 A1 * | 7/2002 | Lupien et al. | .................. | 370/338 |
| 2002/0138843 A1 * | 9/2002 | Samaan et al. | .................. | 725/87 |
| 2002/0146011 A1 * | 10/2002 | Stern | .......................... | 370/395.2 |
| 2003/0009669 A1 * | 1/2003 | White et al. | ................... | 713/176 |
| 2003/0110131 A1 * | 6/2003 | Alain et al. | ..................... | 705/51 |
| 2005/0198531 A1 * | 9/2005 | Kaniz et al. | ................... | 713/201 |
| 2005/0259824 A1 * | 11/2005 | Isozaki et al. | ................. | 380/255 |
| 2006/0159259 A1 * | 7/2006 | Gentry | ............................ | 380/42 |

* cited by examiner

*Primary Examiner* — Nirav B Patel
(74) *Attorney, Agent, or Firm* — Sughrue Mion, PLLC (57) ABSTRACT

Integration of the components of video monitoring, audio messaging, IP telephony, and video conferencing on a single infrastructure platform is provided. Data communications enable voice and video devices to communicate directly with compatible platforms at unlimited geographical locations supported by common wired and wireless networking standards and telecommunications protocols. Completely software driven encryption methods are used to ensure a portable, private, encryption-secure device-to-device and client server based video monitoring and teleconferencing system. Voice biometrics are also used as an authentication method to access the integrated system.

21 Claims, 9 Drawing Sheets

Figure 3 – Gateway Server

DEVICE-TO-DEVICE AND CLIENT SERVER BASED VIDEO MONITORING AND VIDEO TELECONFERENCING/SERVER NETWORKING TECHNOLOGY FOR REMOTE MONITORING

CROSS-REFERENCE TO RELATED APPLICATIONS

This application claims the benefit of U.S. Provisional Application No. 60/685,874, filed Jun. 1, 2005, which is incorporated by reference, herein, in its entirety.

FIELD OF THE INVENTION

This invention relates to an integrated computer system that provides private encryption-secured device-to-device and client server based video monitoring and video teleconferencing technology for remote monitoring.

BACKGROUND OF THE INVENTION

Video encryption is extremely useful for preventing the interception and viewing of any transmitted video or other information over computer networks. For example, law enforcement video surveillance being relayed back to a central viewing center, can be easily intercepted and viewed by third parties if the information is not encrypted. Conventional remote monitoring systems have been unable to successfully encrypt live streaming video data over wireless computer networks.

Traditional systems utilize video scrambling technology or interlacing in order to encrypt video streams. However, scrambling and interlacing methods can be easily decoded by third parties, and the transmitted information compromised.

Traditional web browsers such as Firefox, Microsoft Internet Explorer, Netscape, Mozilla, and Opera may be used to access video streams. However, these interfaces are replete with information security deficiencies, and it is very easy for unauthorized individuals to capture and/or redirect video streams viewed through these browsers. In many instances, the intended receiver does not know that the video stream has been compromised.

SUMMARY OF THE INVENTION

An object of the invention, among others that will be noted by the reader, is to overcome the problems of the aforementioned approaches.

The invention facilitates the integration of remote video conferencing, video monitoring, voice over IP (VOIP), remote access and data messaging on a single infrastructure platform, into commercially available wired or wireless devices. The platform integrates the use of computers, cameras, databases, servers, handheld devices, PDA's, audio devices and other devices in remote monitoring systems.

Data communications enable voice and video devices to communicate directly with compatible platforms at unlimited geographical locations supported by common wired and wireless networking standards (such as IEEE or IETF) and telecommunications protocol (such as Bluetooth, Wi-Fi, cellular, broadband, Internet Protocol, and satellite communications).

The system provides private, encryption-secured, device-to-device monitoring, and includes encryption-secured communications backbone capability with ad-hoc virtual private network creation and maintenance capabilities. The encryption process is software controlled, and requires no additional hardware components.

The invention is taught below by way of various specific exemplary embodiments explained in detail, and illustrated in the enclosed drawing figures.

BRIEF DESCRIPTION OF THE DRAWINGS

The drawing figures depict, in highly simplified schematic form, embodiments reflecting the principles of the invention. Many items and details that will be readily understood by one familiar with this field have been omitted so as to avoid obscuring the invention. In the drawings.

DETAILED DESCRIPTION

The invention will now be taught using various exemplary embodiments. Although the embodiments are described in detail, it will be appreciated that the invention is not limited to just these embodiments, but has a scope that is significantly broader. The appended claims should be consulted to determine the true scope of the invention.

Figure 1:
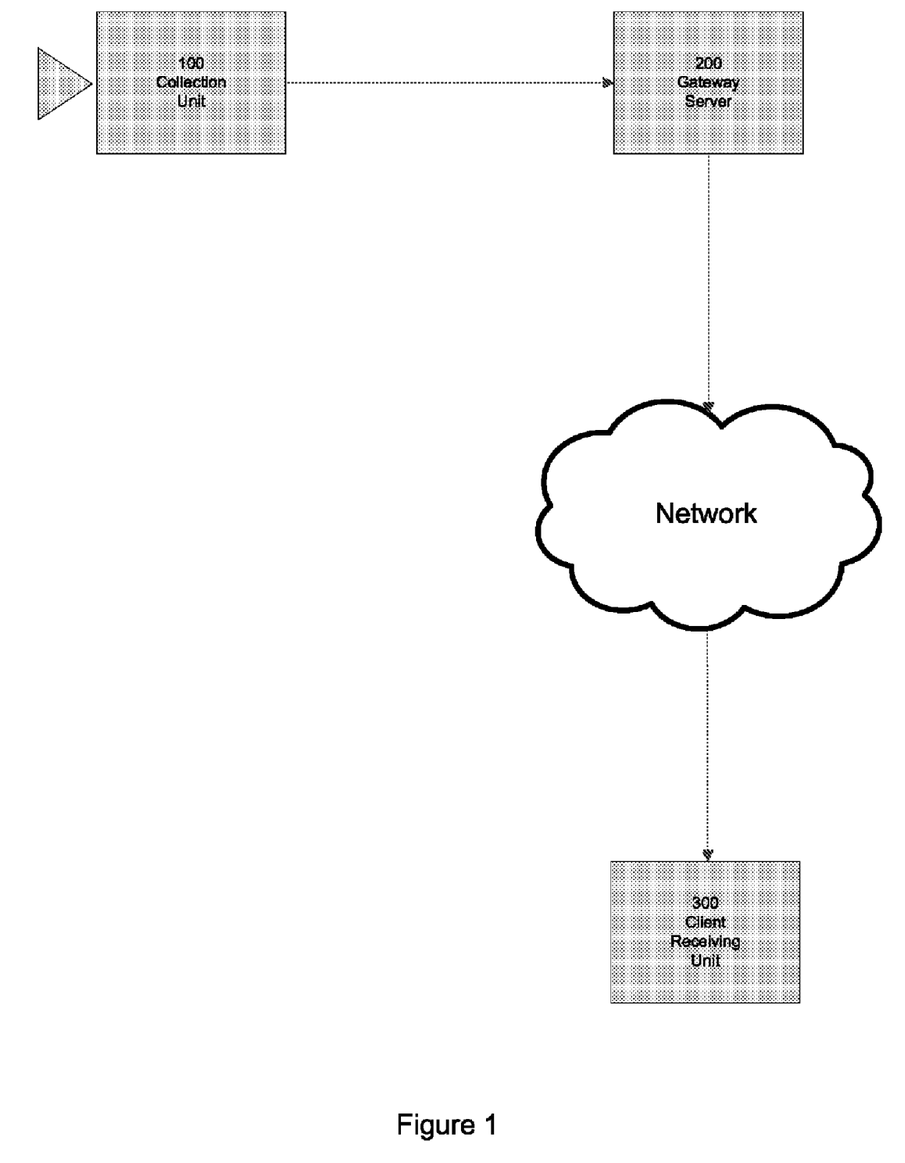
FIG. 1 is a highly simplified schematic diagram showing one embodiment of the invention.

FIG. 1 shows an embodiment of the invention. In FIG. 1, 100 indicates a collection unit, 200 indicates a gateway server, and 300 indicates a client receiving unit.

Figure 2:
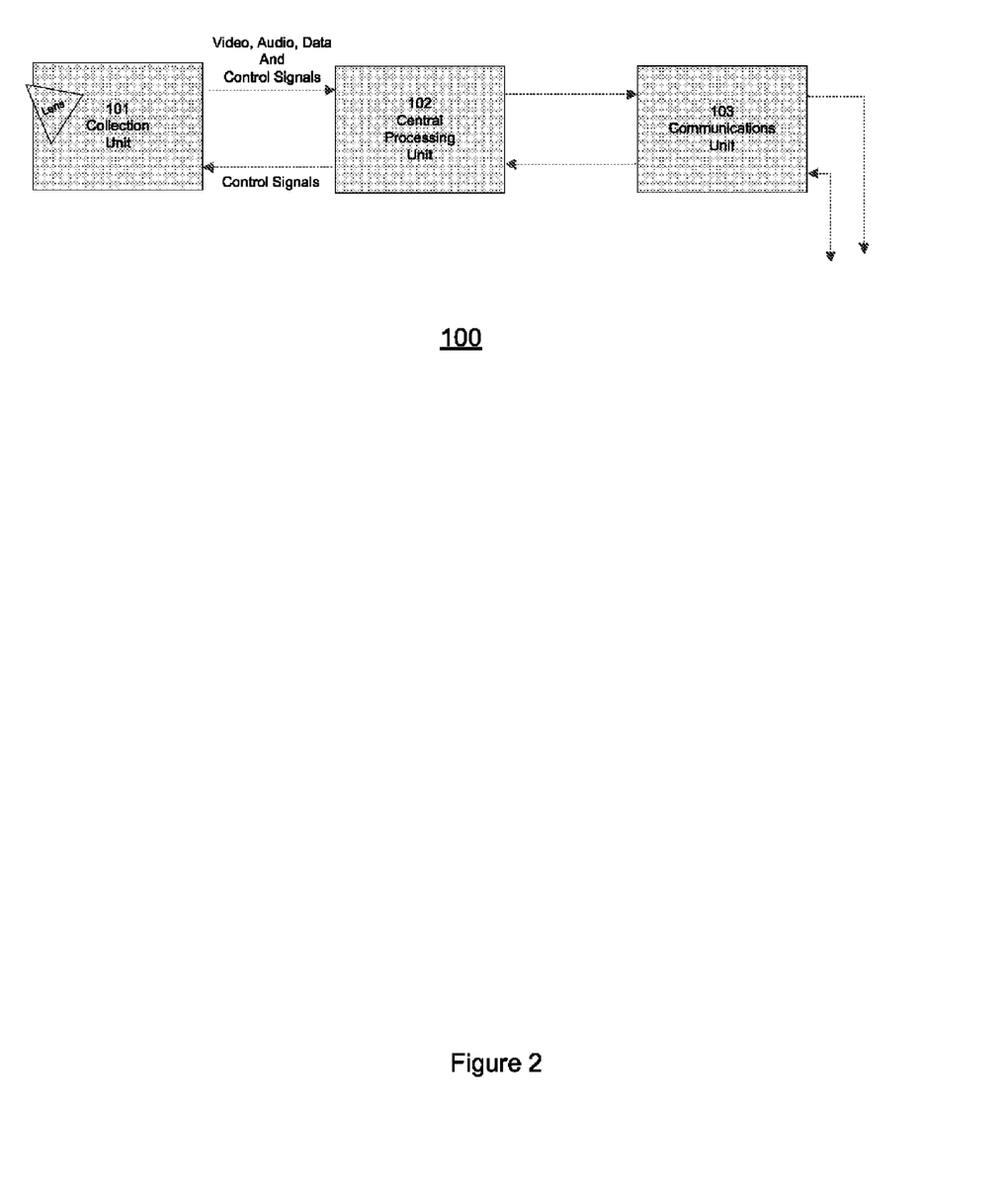
FIG. 2 shows a more detailed view of one of the components depicted in FIG. 1.

The collection unit 100, shown in more detail in FIG. 2, includes a digital camera 101, a CPU 102, and a communication unit 103. The camera 101 is used to capture moving images from a remote location. Although only one camera is depicted in the figure, it is to be understood that multiple cameras may be used to capture information from plural locations. The captured frames are converted into a series of Internet Protocol (IP) packets and sent via communication unit 103, to the gateway server 200.

Figure 3:
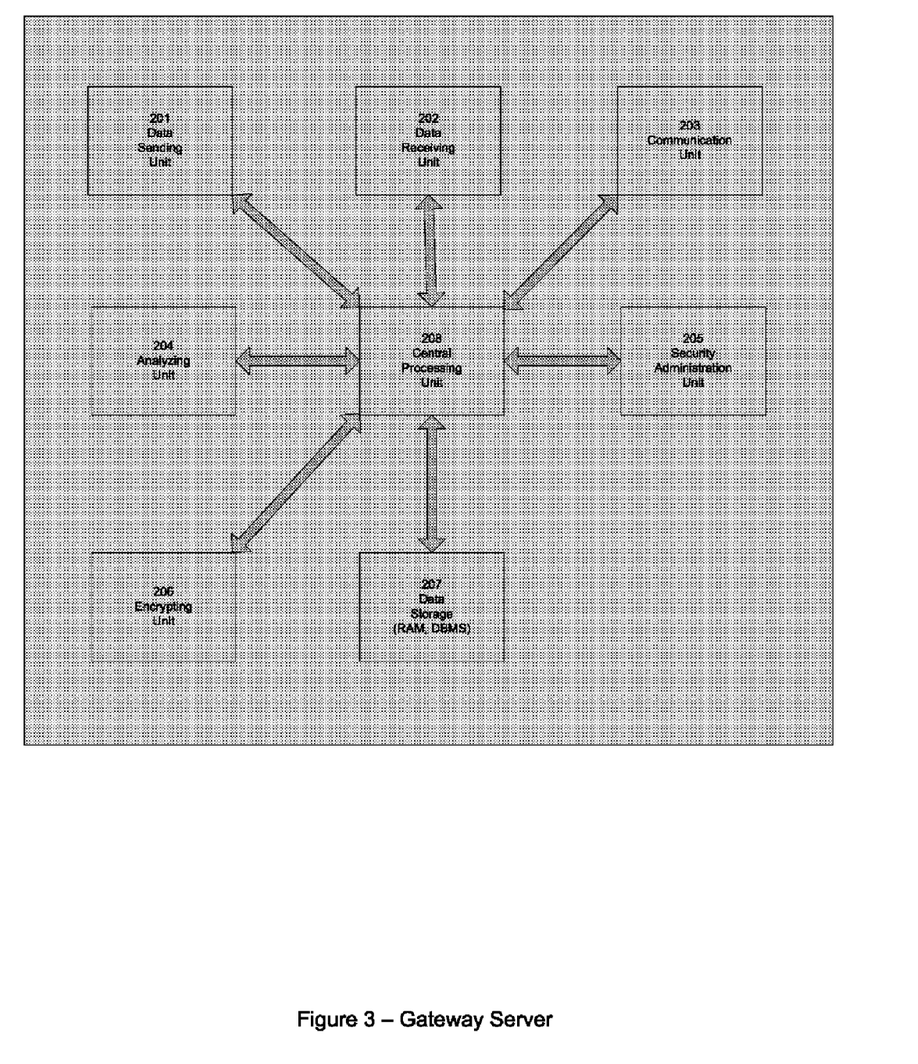
FIG. 3 shows a more detailed view of another one of the components depicted in FIG. 1.

The gateway server 200, shown in more detail in FIG. 3, includes a data sending unit 201, a data receiving unit 202, a communication unit 203, an analyzing unit 204, a security/administration unit 205, an encrypting unit 206, a database management system 207, and a controller 208.

The following discussion relates to an implementation using the IP protocol, in which data units are IP packets. Those familiar with this field will appreciate that the teachings can be applied in other environments such as Asynchronous Transfer Mode (ATM) or Multi Protocol Layering Service (MPLS), and with protocols having data units other than IP packets.

The gateway server 200 receives IP frames from the collection unit via a switch (502). A data receiving unit 202 receives the IP frames under control of the CPU 208. The data is then analyzed by the analyzing unit to determine the source and destination addresses, and to ensure that the frame is valid.

In one exemplary embodiment of the invention, the IP frames are encrypted by a software-based encryption process in the gateway server. The composition of an IP frame in the context of the present exemplary embodiment will become clearer with the discussion below with regard to Table 1.

TABLE 1

IP Header Format

| | |
|---|---|
| OCTET 1 | Version (4 bit) + IHL (4 bit) |
| OCTET 2 | Type of service |
| OCTET 3, 4 | Total Length |
| OCTET 5, 6 | Identification |
| OCTET 7, 8 | Flags |
| OCTET 9 | Time to Live |
| OCTET 10 | Protocol |
| OCTET 11, 12 | Header Checksum |
| OCTET 13, 14, 15, 16 | Source Address |
| OCTET 17, 18, 19, 20 | Destination Address |
| OCTET 21, 22, 23 | Options |
| OCTET 24 | Padding |
| OCTET 25, 26 . . . | Data |

The IP header informs the recipient of the destination and source addresses of the packet, the number of octets in the packet, the protocol that the packet carries, etc. The Options octets (Octets 21, 22, and 23) are 24 bits in total length, and in the present embodiment may be understood to constitute an indicator field used in association with encryption and control processes. The indicator field data is seeded/encrypted with values associated with the encryption and control parameters of each IP packet and examined using inspection of the packet header, in context (including information relating to packet data, connections utilized, and packet validity) at the network level, which may utilize, e.g. AES 256 encryption of the data payload. The gateway server evaluates the seeded values in the bits of the indicator field against a user key to determine whether the packet is valid.

The indicator field is primarily used to determine data characteristics including, but not limited to: the identity of the sender of the packet (Packet sender Id) (PSI) (the authenticated identification code of the sender, not the source IP address); packet viewing priority (PVP) (permissions); packet control characteristics (PCC); the packet encryption method (PEM); the packet encryption seed (PES) (the seed value associated with the stated packet encryption method); and the packet encryption credentials (PEC) (a pointer to a preauthorized public or private encryption key which is stored within the collection unit, the gateway server or the client receiver unit).

The data characteristic flags are set in a heuristic manner, by eliminating any obfuscation (data clarification) and unshuffling (normalizing) shuffled packet data, then proceeding to derive by calculation or reference table value checking (table lookup) the values for the associated parameter (such as PSI, PVP, PCC, PEM, PES, and PEC) keyed to the applicable numerical value in the appropriate octet, nibble (half-octet), bit, or combination.

Data shuffling and data obfuscation of IPv4 protocol option octets and IPv6 protocol extension headers may be used for parameter encoding and security during data transfer. Heuristic (rule-based) IPv4 data packet option octet clarification and normalization may be used for parameter decoding; heuristic derivation of IPv4 data packet characteristics are indicated by data packet option octet data by means of algorithm or table lookup, and heuristic IPv6 data packet extension headers normalization and clarification may be used for parameter decoding.

The packet data is intentionally shuffled or obfuscated, and must be evaluated using the same rule sets that were used to initially shuffle or obfuscate the packet data. For Example:
Shuffled Data:
  1001 0110 1001 0110 1001 0110, might actually represent:
    0110 1001 0110 1001 0110 1001—if inverted, each bit is replaced with its opposite value.
    1010 1010 1010 1010 1010 1010—if partially trans-positionally inverted, alternating half nibbles are transposed.
    0000 0000 0000 0000 0000 0000—if partially positionally negated, the 1's are negated etc.
Obfuscated Data:
  1001 0110 1001 0110 1001 0110, might actually represent:
    1001 0000 0000 0110 1001 0000—if partial octet obfuscation is employed,
    1000 0111 1000 0111 1000 0111—if bitwise obfuscation is employed, etc The encryption process of the present invention is therefore done on an "intra-packet" basis, as opposed to the entire packet being encrypted. In conventional encryption methods, the entire packet is analyzed and encapsulated. This results in increased processing time. In the present invention, only specific bits in the IP header are sampled and encrypted. This results in a decreased processing time.

The database management system 207 of the gateway server archives live audio, video and data streams received from the collection unit. This data may then be transmitted to various client receiving units. Each frame of video data, for example, may be stored as a record.

The security/administration unit 205 contains a list of all authorized users and devices in the network. This unit stores the last known locations of all devices, their IP addresses, including Dynamic Host Configuration Protocol/Network Address Translation (DHCP/NAT) information, and other attributes.

Figure 4:
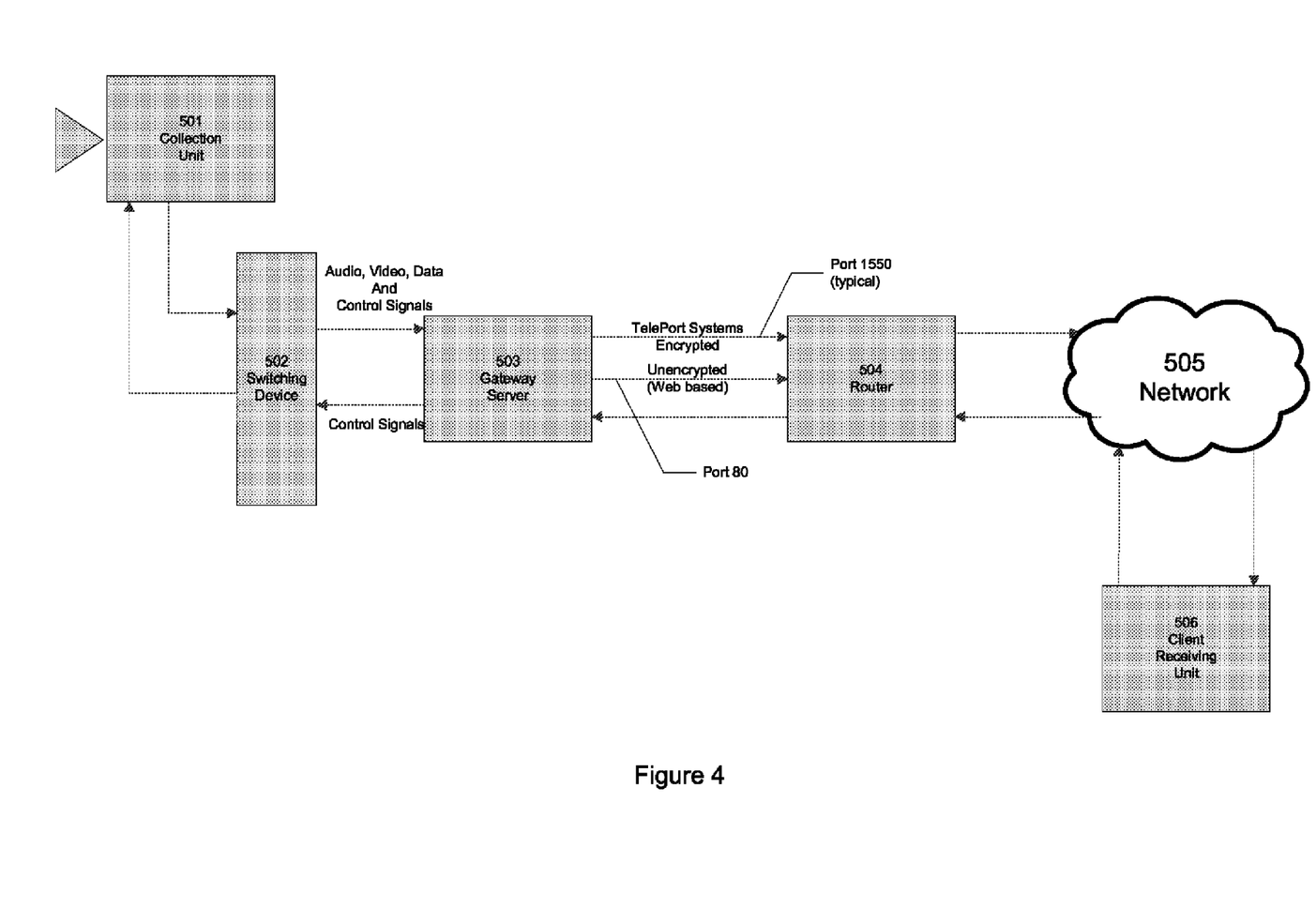
FIG. 4 shows a detailed view of the data collection and receiving system in an exemplary embodiment of the invention.

FIG. 4 depicts a detailed view of the data collection and receiving system of an embodiment of the present invention.

A collection unit 501 may be remotely controlled by a user at a client receiving unit 505. The user sends commands to the gateway server 200. The gateway server 200 then sends the corresponding commands to the indicated collection unit to enable the user to control that unit. The user has the ability to rotate, pan, or tilt the camera and zoom in and out in order to more closely examine selected images. The ability of the user to control the camera remotely depends on the level of authority the user has. The captured images or frames are transformed into packet form and than sent to a switch 502. The switch 502 then determines which gateway server should receive the frames. The gateway server analyzes the frames and sends each frame to client receiving unit 505 based on the results of the analysis. The gateway also examines each indicator field of each packet to determine whether to pass commands on to a specified collector unit 501.

At the gateway server, the data may be digitally watermarked prior to being stored and after a copy of the data has been sent to the client receiving unit 505. In this process, a pattern of bits are inserted into the digital image, audio, or video file in order to easily identify the image or data. The presence or absence of the watermarks allow a user to determine whether the information has been altered. Digitally watermarking the data is also advantageous in that it easily provides identification to the data if it is being used for evidentiary purposes.

In one exemplary embodiment of the invention, the data may be encrypted in the collection unit. If the data entering the gateway server is encrypted, it is decrypted, watermarked and then stored. If the data entering the gateway server is unencrypted, it is watermarked and then stored.

Figure 5:
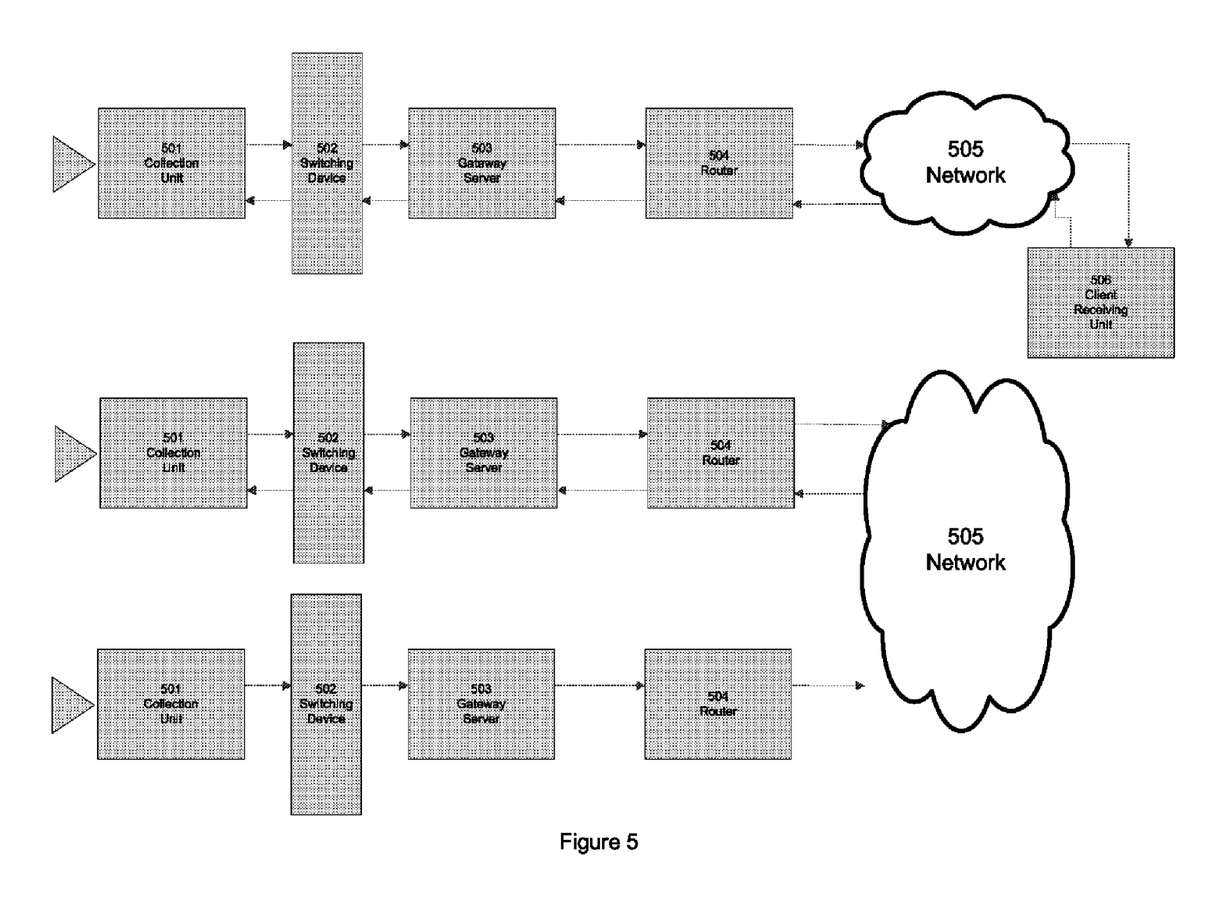
FIG. 5 shows the failover capability of the system in an exemplary embodiment of the invention.
Figure 6:
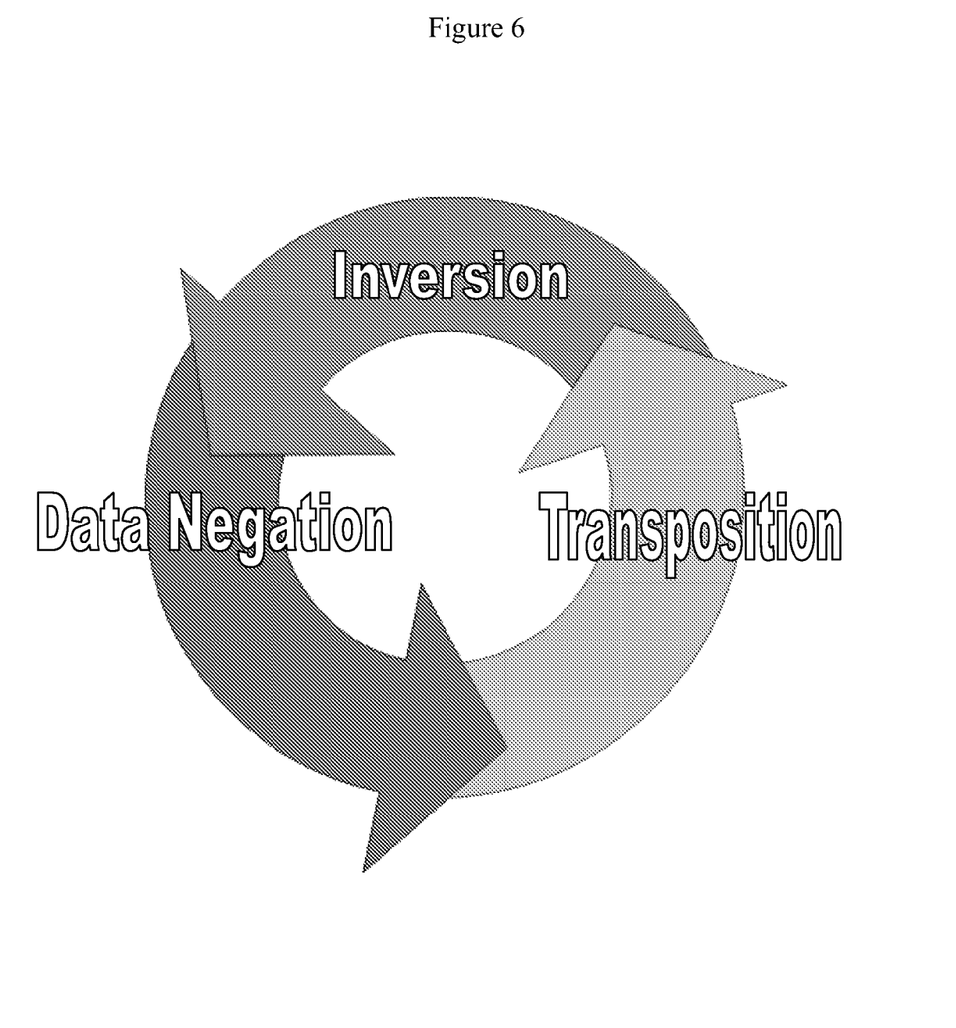
FIG. 6 shows the bit inversion process in an exemplary embodiment of the invention.
Figure 7:
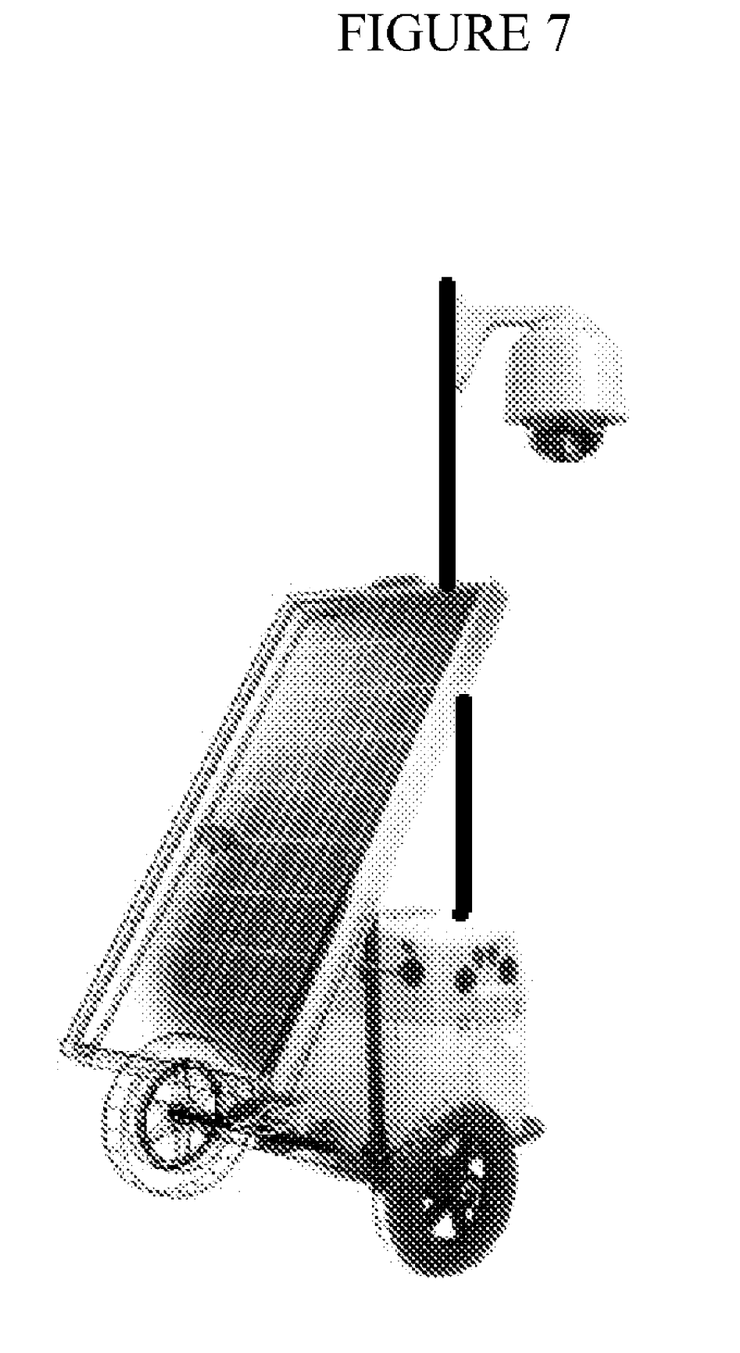
FIG. 7 shows a view of an exemplary embodiment of the invention.
Figure 8:
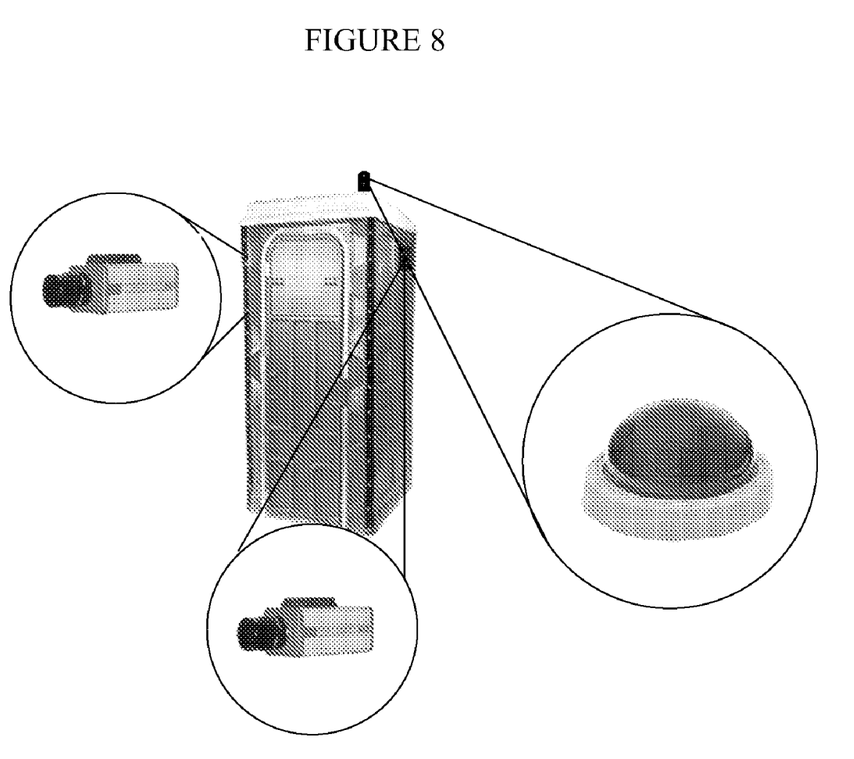
FIG. 8 shows a view of yet another exemplary embodiment of the invention.
Figure 9:
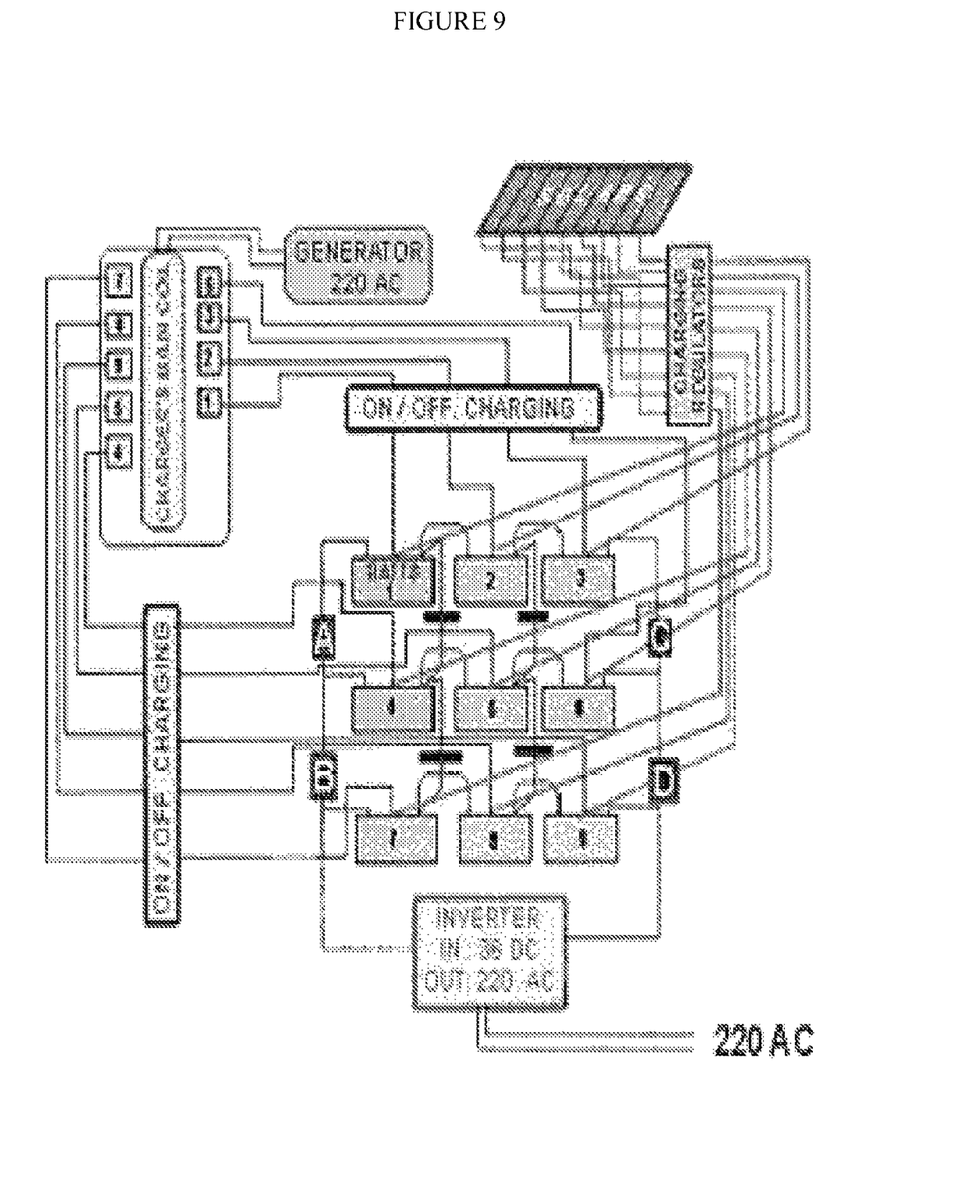
FIG. 9 shows a detailed view of one of the components of FIG. 8.

In another aspect of the invention depicted in FIG. 5, the system is fully redundant in that it has complete failover capability. In the event of a failure in any one of the camera 501, switch 502, or gateway server 503, in a particular network, the network router located in the failed network mirrors its routing table and authentication data to the second or alternate network. Accordingly, data from the failed network is routed to the alternate network.

In another aspect of the invention, Public-Key Infrastructure (PKI), users are authenticated by a root authority or "certificate authority". These features are commonly embedded into Government, military, financial, and corporate organizations and their data processing infrastructures. Prior to accessing data, the user must be electronically authenticated to the system through a digital certificate or approved token or "signing authority", using an X.509 compliant protocol. Users who are authenticated to the system of the invention by means of PKI may have their access be granted, limited, revoked, or suspended.

In yet another variation, the collection units and the client receiving units may be wireless devices. The intra-packet encryption method encrypts random bits within the packet, its use in wireless systems would also prevent the data from being easily decoded by third parties, and prevent unauthorized individuals from capturing and/or redirecting video streams.

In still another variation, if a signal failure or discontinuity of a signal from the collection unit is detected by the gateway server, a discontinuity indicator (or test pattern) is inserted into the data stream being sent to the client receiving unit 505. This alerts the user to the fact that a transmission failure has occurred.

Other variations might include biometric authentication in order to provide greater security to the system. If the user device is biometric enabled, the user will be authenticated by providing fingerprint, voice print, smartcard or other biometric methods in order to access the system. For example, in voice print biometric access, the user's voice print is matched against a digital certificate stored on the gateway server. If authentication is successful, the user is granted access to the system, and is given rights based on their user authority. Users with authority to administer the system can create or remove users, schedule audio or video data collections, and have full administrative control of the system.

In yet another embodiment, the system is scalable. The system can be embodied in a portable manner by utilizing a cart-borne mobile monitoring/surveillance device. The mobile cart-type device comprises a weather proof enclosure which protects the interior units from the environment; a power inverter; a solar panel; a storage battery; a gateway server, and an IP-based camera with its own environmental enclosure.

The mobile cart-borne system is advantageous in that it gives users the flexibility to rapidly establish remote surveillance or monitoring in emergency situations.

In still another embodiment, the system is embodied as an Outhouse unit. This system comprises storage batteries, a power inverter; an ac/dc converter; a network switch; a wireless access port; an IP-based camera with environmental enclosure, and two-way audio transmission. Although the Outhouse remote monitoring/surveillance system may not be fully mobile, it may be moved to different locations as a need arises.

Yet other combinations and subcombinations of the various embodiments described above will occur to those familiar with this field, without departing from the scope and spirit of the invention.

There is claimed:

1. A system intended for use in remote digitized video or audio teleconferencing, monitoring, or surveillance, and data transmission comprising:
   one or more hardware collection units addressable individually or collectively via synchronous or asynchronous transmission protocols with encryption available to the transmission packet level;
   one or more client receiving units addressable individually or collectively via synchronous or asynchronous transmission protocols, with encryption available to the transmission packet level;
   at least one gateway server which receives units of streaming digital data which contain embedded authentication levels, control restrictions, methods of encryption, and dynamic engineering control parameters from the one or more collection units, or client receiving units and storing the streaming digital data under the control of a database management system,
   wherein each gateway server is adapted to respond to commands from the client receiving units, and to provide the corresponding commands to remotely control the one or more collection units and provides control feedback information to the client receiving units,
   wherein the units of streaming data are each provided with one or more indicator fields, and wherein the indicator fields indicate identities of authenticated entities together with three or more of their authentication levels, control restrictions, encryption methods, and dynamic engineering control parameters, and
   wherein if a signal failure of a signal from the one or more collection units is detected by a client receiving unit or the gateway server, a discontinuity indicator is inserted into the streaming data, and
   wherein the gateway server consists of a client receiving unit which receives the streaming digital data.

2. The system of claim 1 wherein the units of digital data are encrypted via a software-based encryption-capable platform or directly accessible hardware encryption device.

3. The system of claim 2, wherein the units of digital data are IP packets or specially modified IP packets, and intra-packet encryption is performed on bits of the packet.

4. The system of claim 3, wherein the intra packet encryption further includes seeding bits of one or more indicator fields.

5. The system of claim 4, wherein the indicator fields are associated with the three or more of the encryption methods, authentication levels, control restrictions, and dynamic engineering control parameters and are included in IP packet header information.

6. The system of claim 5, wherein the bits of the indicator fields are seeded on the basis of a predetermined encrypting scheme.

7. The system of claim 6, wherein the predetermined encrypting scheme and applicable parameters such as authentication levels, control restrictions, and dynamic engineering control parameters include seeding frames with bits in each IP packet which are examined using inspection of the packet header at the network level or receiving device level.

8. The system of claim 7 wherein the seeding is based on user authorization levels and permissions, dynamic engineering control requirements, the method of encryption; authentication, and associated security parameters.

9. The system of claim 8, wherein the permissions granted to a user, encryption methods employed, and dynamic engineering control parameters are immediately made effective by changes effected in indicator fields of each packet.

10. The system of claim 9, wherein the indicator fields are 24 bits in length.

11. The system of claim 3, wherein the encryption is done in a heuristic manner and with a capability to controllably modify encryption methods.

12. The system of claim 3, wherein data shuffling and data obfuscation of IPv4 protocol option octets are used for parameter encoding and security during data transfer.

13. The system of claim 3, wherein data shuffling and data obfuscation of IPv6 protocol extension headers are used for parameter encoding and security during data transfer.

14. The system of claim 1, wherein the gateway server analyzes the indicator fields based on a user keys to determine authentication levels, control restrictions, methods of encryption, dynamic engineering control parameters and security parameters.

15. The system of claim 1, wherein the collection units further comprise wireless devices which transmit and receive embedded authentication levels, control restrictions, methods of encryption, and dynamic engineering control parameters.

16. The system of claim 1, wherein the client receiving units further comprise wireless devices which transmit and receive embedded authentication levels, control restrictions, methods of encryption, and dynamic engineering control parameters.

17. The system of claim 1, wherein, upon failure of one or more of the gateway servers, router, collection unit, or switch occurs, the system fails-over to corresponding alternate gateway servers, routers, collection units, or network.

18. The system of claim 1 wherein the streaming digital data is video information; the video information is in frames; and the frames of video information are digitally watermarked prior to being stored under control of the database management system.

19. The system of claim 1, wherein the data is audio data.

20. The system of claim 1, wherein the data is video data.

21. An integrated video monitoring and video teleconferencing system for remote monitoring, which provides audio, video, and data communications functions, comprising:
    one or more hardware collection units which utilize three or more of authentication levels, control restrictions, methods of encryption, and dynamic engineering control parameters,
    one or more client receiving units which control the three or more of authentication levels, the control restrictions, the methods of encryption, and the dynamic engineering control parameters,
    at least one gateway server which receives Internet Protocol (IP) or proprietarily modified IP packet units of streaming digital data including three or more of embedded authentication levels, control restrictions, methods of encryption, and dynamic engineering control parameters from the collection units; and stores the units of streaming digital data in a database management system,
    a switch which connects each collection unit to the gateway server and conducts transmissions with the three or more of the embedded authentication levels, the control restrictions, the methods of encryption, and the dynamic engineering control parameters, and
    a router which transmits and receives the units of data, video or audio information from the gateway server to the client receiving units and transmits and receives the three or more of the embedded authentication levels, the control restrictions, the methods of encryption, and the dynamic engineering control parameters,
    wherein the one or more client receiving units are capable of sending commands, the three or more of the authentication levels, the control restrictions, the methods of encryption, and the dynamic engineering control parameters to the collection units via the gateway server in order to remotely control the collection units, and
    a software based encryption-capable platform allows encryption of the units streaming digital data, with encryption methods selectable by packet level control information.

* * * * *